United States Patent [19]
Smith

[11] Patent Number: 6,090,238
[45] Date of Patent: Jul. 18, 2000

[54] VINYL DECAL AND GRAPHICS REMOVAL PROCESS

[76] Inventor: William Smith, 5 Hood Dr., Plymouth, Mass. 02360

[21] Appl. No.: 09/121,209

[22] Filed: Jul. 23, 1998

Related U.S. Application Data

[60] Provisional application No. 60/053,515, Jul. 23, 1997.

[51] Int. Cl.$^7$ ..................................... B32B 35/00
[52] U.S. Cl. ............................. 156/344; 134/26; 134/123
[58] Field of Search ........................ 134/26, 95.3, 103.3, 134/123; 156/344, 584

[56] References Cited

U.S. PATENT DOCUMENTS

| | | | |
|---|---|---|---|
| T947,009 | 6/1976 | Ammons | 156/344 |
| 3,920,472 | 11/1975 | Vinson | 134/38 X |
| 4,220,549 | 9/1980 | Moore et al. | 134/38 X |
| 4,336,072 | 6/1982 | Moore et al. | 134/38 X |
| 4,690,724 | 9/1987 | Outlaw | 156/584 |
| 5,190,620 | 3/1993 | Winter | 156/344 |
| 5,259,914 | 11/1993 | Fisher | 156/344 X |
| 5,273,059 | 12/1993 | Gross et al. | 134/123 X |
| 5,442,851 | 8/1995 | Lerner et al. | 156/584 X |

FOREIGN PATENT DOCUMENTS

| | | | |
|---|---|---|---|
| 63-199784 | 8/1988 | Japan | 156/344 |

OTHER PUBLICATIONS

"3M Instruction Bulletin 6.6", Film Removal Using Film and Adhesive Remover, Apr., 1990.

"3M Instruction Bulletin 6.4", Instructions for Removal of Scotchlite (TM) Series 690 Reflective Sheeting, Jun., 1990.

"3M Instruction Bulletin 6.5", Storage, Maintenance and Removal of Films and Sheeting, Nov., 1991.

*Primary Examiner*—Mark A. Osele
*Attorney, Agent, or Firm*—Ernest V. Linek; Banner & Witcoff, Ltd.

[57] ABSTRACT

The present invention is a process utilizing heated pressurized water and non-toxic citrus-based solvents for the removal of vinyl decals and graphics. The process is conducted step by step, using a balance of water volume, pressure, temperature, angle and non-toxic chemicals to remove vinyl graphics and glue residue.

38 Claims, No Drawings

VINYL DECAL AND GRAPHICS REMOVAL PROCESS

CROSS-REFERENCE TO RELATED APPLICATION

This application claims benefit of the following provisional application, Application Ser. No. 60/053,515, filed Jul. 23, 1997, the disclosure of which is hereby incorporated herein by reference.

BACKGROUND OF THE INVENTION

In this ever-changing world of corporate takeovers, fleets of commercial vehicles are frequently being modified to reflect the name and logo of the new corporate owner. Years ago corporate identities were painted directly on vehicles. However, the cost associated therewith mandated a change, and now vinyl decals have replaced paint in nearly all applications.

The removal of vinyl decals from hard surfaces (e.g., auto, truck, bus, railroad, marine, and aircraft bodies, and the like) is normally a time-consuming and labor intensive job. The 3M Company, manufacturer of many different types of vinyl decals, recommends the careful application of heat (via a heat gun) and scraping for removal of most of their decals. This method is then usually completed by a final application of an adhesive remover, usually in the form of a toxic solvent, such as methyl ethyl ketone (MEK), toluene, heptane, naphtha, mineral spirits, or the like. See for example "Instructions for Removal of Scotchlite® Series 690 Reflective Sheeting," 3M Instruction Bulletin No. 6.4 (June 1990); "Storage, Maintenance and Removal of Films and Sheeting," 3M Instruction Bulletin No. 6.5 (November 1991); and "Film Removal Using Film and Adhesive Remover," 3M Instruction Bulletin No. 6.6 (April 1990).

SUMMARY OF THE INVENTION

The present invention is directed to a process utilizing pressurized water and environmentally friendly solvents for the removal of vinyl decals and graphics from hard substrates, particularly vehicles, e.g., cars, trucks, buses, and the like. The process is conducted step by step, using a balance of water volume, pressure, temperature, spray angle and non-toxic chemicals to remove vinyl graphics and glue residue.

The method of the present invention includes the following steps:

(a) super heated, pressurized tap water is delivered at a first predetermined distance, angle, pressure and temperature, to strip the vinyl decal or graphics from the hard substrate surface, without harming the substrate surface (usually a painted surface);

(b) super heated water is delivered at a second predetermined distance, angle, pressure and temperature, to dissolve and remove most of the adhesive residue from the substrate surface; and (c) finally, a pressurized citrus based solvent is used to completely free the substrate surface of any residual adhesive, leaving the substrate ready for reapplication of new decals or graphics, or simply to be left free of such materials.

This process was created to enhance our decal application business, which was limited proportionately to the number of vehicles we could strip in a given amount of time. Conventional decal and graphics stripping is a time consuming, messy operation, which was not cost effective. Thus the need for a fast, safe, neat process.

While it is believed that any naturally derived citrus-based solvent could be used in this invention, in its most preferred embodiment, the citrus-based solvent used is D-Limonene, which is typically obtained from orange peels. D-Limonene has the following chemical structure:

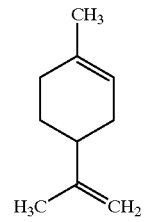

D-Limonene is a biodegradable solvent occurring in nature as the main component of citrus peel oil. D-Limonene's interesting chemical properties, pleasant citrus aroma, & FDA-GRAS rating ("generally recognized as safe") have earned the product phenomenal acceptance in many diverse chemical applications. D-Limonene can be used in its pure form, blended with most other solvents & drying oils, or easily emulsified to make water-soluble cleaning products.

D-Limonene is generally a water-white to slightly yellow liquid with mild to strong citrus aroma depending on grade.

D-Limonene has been sold as a replacement for toxic chlorinated solvents, glycol ether, MEK (methyl ethyl ketone), xylene, Freon, and CFC's. Some of the many common uses of D-Limonene include parts cleaner, engine degreaser (automotive, aircraft, and aerospace industries), electronics cleaning, tar and asphalt remover, asbestos shingle remover, graffiti remover, grease trap maintainer, lift station and sewage treatment applications, hand cleaner, floor cleaner, printing press cleaner, carpet stain cleaner, metal cleaner, aerosol ingredient, fragrance additive, odorant for petroleum industry, heat transfer medium. There are numerous commercial sources for various grades of D-Limonene, many of which may be found through the World Wide Web (www) on the Internet.

DETAILED DESCRIPTION OF THE INVENTION

As described above, the present invention is directed to a process utilizing water for the removal of vinyl decals and graphics. The process is conducted step by step, using a balance of water volume, pressure, temperature, angle and non-toxic chemicals to remove vinyl graphics and glue residue.

Prior to this invention the generally acceptable methods of vinyl removal included the use of open flame torches or heat guns producing temperature of 350 degrees Celsius, followed by the use of chlorinated, toxic or hazardous solvents. These methods are environmentally unfriendly, user unfriendly, and substrate unfriendly.

The method of the present invention overcomes all of these prior art deficiencies. The method of the present invention utilizes super heated, pressurized tap water to initially strip the decals off of the hard substrate surface. Super heated water is then used to dissolve and then remove most of the adhesive residue. A final step, which uses an extract from citrus fruit, completely frees the surface of any residue with no negative impact to the environment.

A pressure washer capable of producing high temperature/ steam with a minimum volume of 4 GPM at a temperature of at least 90 degrees Celsius directed to the substrate by a fan tipped nozzle of 15–40 degrees utilizing a pressure in excess of 2500 PSI will remove vinyl graphics. In the current best mode of this invention, the water is delivered under the following conditions; 4000 PSI @ 6 gallons per minute, 110 degrees Celsius water directed through a 25 degree fan tip nozzle at a 165 degree angle to the substrate to remove vinyl graphics. The tip is held at a distance of ¾–1½ inches from the substrate utilizing a short wand (1-foot) with a side handle for total control.

The current best mode was developed after exhaustive testing, it being experience that too much water pressure without enough volume may cause paint stripping from the substrate. Further, it was determined that too much heat without enough volume may cause substrate paint failure or ineffective decal removal.

As the heated pressurized water hits the substrate, it acts like a heated liquid scraper removing the vinyl and leaving behind the glue residue. Once exposed to the atmosphere, the glue hardens in a matter of seconds.

The process for the adhesive removal is similar except the angle that is needed to blast away the glue is between 75 and 110 degrees at a distance of 3 to 4 inches relative to the substrate. The process can be repeated.

The final step is to allow the area with adhesive to dry and then spray with a solvent containing a minimum of 50% D-Limonene. A waiting time of at least 2 minutes allows the solvent to dissolve the adhesive. The dissolved adhesive can then be removed by applying a hot water power wash starting from the top to bottom working horizontally side to side until all glue is gone. We now have a surface ready for decal reapplication or to be left blank as is.

Under the current best mode of this invention, 97% D-Limonene, obtained from the Zep Manufacturing Co. of Atlanta, Ga. is used. Another commercial source of high purity D-Limonene is the Florida Chemical Co. of Winter Haven, Fla. This company has three grades available (Technical Grade D-Limonene is 95%, food grade is 96%, and lemon-lime grade is 70%.) in commercial quantities ranging from 1 gallon to 6500 gallons.

Accordingly, the method of the present invention is environmentally safe, extremely fast and thorough with little or no damage to the hard substrate surface. In these times of corporate mergers and buy-outs, vehicle re-identification is fast gaining popularity. This method will improve working conditions, minimize environmental impact and increase productivity by at least 300%.

Although the invention was described with reference to removing adhesive vinyl decals from vehicle bodies, the process can be used for the removal of adhesive plastic decals from any hard surface, for example: removal of adhesive simulated finish decals from metal furniture; removal of identification- or mark-bearing labels or lettering on fixtures, signage, floors or equipment; removal of team insignia from football and baseball batting helmets, etc. The process may be used with a variety of substrates, including metal, wood, plastic, linoleum, glass, magnetic sheeting, etc. The process is also useful in removing unwanted bumper stickers from vehicles.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A method for removing an adhesive decal from a relatively hard substrate, wherein the decal comprises a plastic decal body held onto the substrate by an adhesive, comprising the steps of:

removing the decal body from the substrate by delivering water at a first predetermined temperature, first predetermined pressure and first predetermined flow rate from a nozzle at a first predetermined distance and first predetermined angle with respect to the substrate surface bearing the adhesive decal;

thereafter removing adhesive from the substrate by delivering water at a second predetermined temperature, second predetermined pressure and second predetermined flow rate from a nozzle at a second predetermined distance and a second predetermined angle with respect to the substrate surface; and thereafter removing adhesive residue from the substrate by delivering a solvent to the substrate surface.

2. The method according to claim 1, wherein the first predetermined temperature is in the range of about 90° to about 130° C.

3. The method according to claim 2, wherein the first predetermined temperature is about 110° C.

4. The method according to claim 1, wherein the first predetermined temperature is in the range of about 2500 psi to about 7500 psi.

5. The method according to claim 4, wherein the first predetermined temperature is about 4000 psi.

6. The method according to claim 1, wherein the first predetermined flow rate is in the range of about 4 gallons per minute to about 8 gallons per minute.

7. The method according to claim 6, wherein the first predetermined flow rate is about 6 gallons per minute.

8. The method according to claim 1, wherein the first predetermined distance is in the range of about ¾" to about 1½".

9. The method according to claim 1, wherein the first predetermined angle is about 165° with respect to the substrate surface.

10. The method according to claim 1, wherein the nozzle comprises a fan-tipped nozzle having a spread in the range of about 15° to about 40°.

11. The method according to claim 10, wherein the fan-tipped nozzle has a spread of about 25°.

12. The method according to claim 1, wherein the second predetermined temperature is in the range of about 90° to about 130° C.

13. The method according to claim 12, wherein the second predetermined temperature is about 110° C.

14. The method according to claim 1, wherein the second predetermined temperature is in the range of about 2500 psi to about 7500 psi.

15. The method according to claim 14, wherein the second predetermined temperature is about 4000 psi.

16. The method according to claim 1, wherein the second predetermined flow rate is in the range of about 4 gallons per minute to about 8 gallons per minute.

17. The method according to claim 16, wherein the second predetermined flow rate is about 6 gallons per minute.

18. The method according to claim 1, wherein the second predetermined distance is in the range of about 3" to about 4".

19. The method according to claim 1, wherein the second predetermined angle is in the range of about 75° to about 110° with respect to the substrate surface.

20. The method according to claim 1, wherein the nozzle comprises a fan-tipped nozzle having a spread in the range of about 15° to about 40°.

21. The method according to claim 20, wherein the fan-tipped nozzle has a spread of about 25°.

22. The method according to claim 1, wherein the solvent is D-Limonene.

23. The method according to claim 22, wherein the solvent comprises D-Limonene in a concentration in the range of about 50% to 100%.

24. The method according to claim 23, wherein the solvent comprises D-Limonene in a concentration in the range of about 70% to about 96%.

25. The method according to claim 24, wherein the solvent comprises D-Limonene in a concentration in the range of about 97%.

26. The method according to claim 1, wherein the decal body comprises vinyl.

27. A method for removing an adhesive decal from a relatively hard substrate, wherein the decal comprises a vinyl decal body held onto the substrate by an adhesive, comprising the steps of:

removing the decal body from the substrate by delivering water at a first predetermined temperature in the range of about 90° to about 130° C., a first predetermined pressure in the range of about 2500 psi to about 7500 psi, and a first predetermined flow rate in the range of about 4 gallons per minute to about 8 gallons per minute from a fan-tipped nozzle having a spread in the range of about 15° to about 40° at a first predetermined distance in the range of about ¾" to about 1½" and a first predetermined angle of about 165° with respect to the substrate surface bearing the adhesive decal;

removing adhesive from the substrate by delivering water at a second predetermined temperature in the range of about 90° to about 130° C., a second predetermined pressure in the range of about 2500 psi to about 7500 psi, and a second predetermined flow rate in the range of about 4 gallons per minute to about 8 gallons per minute from a fan-tipped nozzle having a spread in the range of about 15° to about 40° at a second predetermined distance in the range of about 3" to about 4" and angle in the range of about 75° to about 110° with respect to the substrate surface; and removing adhesive residue from the substrate by delivering a solvent to the substrate surface.

28. The method of claim 27, wherein the solvent is D-Limonene.

29. The method according to claim 28, wherein the solvent comprises D-Limonene in a concentration in the range of about 50% to 100%.

30. The method according to claim 29, wherein the solvent comprises D-Limonene in a concentration in the range of about 70% to about 96%.

31. The method according to claim 30, wherein the solvent comprises D-Limonene in a concentration in the range of about 97%.

32. The method according to claim 27, wherein the decal body comprises vinyl.

33. A method for removing an adhesive decal from a relatively hard substrate, wherein the decal comprises a vinyl decal body held onto the substrate by an adhesive, comprising the steps of:

removing the decal body from the substrate by delivering water at a first predetermined temperature of about 110°, a first predetermined pressure of about 4000 psi, and a first predetermined flow rate of about 6 gallons per minute from a fan-tipped nozzle having a spread of about 25° at a first predetermined distance in the range of about ¾" to about 1½" and a first predetermined angle of about 165° with respect to the substrate surface bearing the adhesive decal;

removing adhesive from the substrate by delivering water at a second predetermined temperature of about 110° C., a second predetermined pressure of about 4000 psi, and a second predetermined flow rate of about 6 gallons per minute from a fan-tipped nozzle having a spread of about 25° at a second predetermined distance in the range of about 3" to about 4" and angle in the range of about 75° to about 110° with respect to the substrate surface; and removing adhesive residue from the substrate by delivering a solvent to the substrate surface.

34. The method of claim 33, wherein the solvent is D-Limonene.

35. The method according to claim 34, wherein the solvent comprises D-Limonene in a concentration in the range of about 50% to 100%.

36. The method according to claim 35, wherein the solvent comprises D-Limonene in a concentration in the range of about 70% to about 96%.

37. The method according to claim 36, wherein the solvent comprises D-Limonene in a concentration in the range of about 97%.

38. The method according to claim 33, wherein the decal body comprises vinyl.

* * * * *